United States Patent [19]

Segawa et al.

[11] Patent Number: 5,964,916
[45] Date of Patent: Oct. 12, 1999

[54] MOLD FOR FORMING GLASS AND METHOD FOR FORMING GLASS

[75] Inventors: Yutaka Segawa; Toshihiro Ohashi, both of Funabashi, Japan

[73] Assignee: Asahi Glass Company Ltd., Tokyo, Japan

[21] Appl. No.: 09/069,988

[22] Filed: Apr. 30, 1998

[30] Foreign Application Priority Data

May 27, 1997 [JP] Japan ................................. 9-137173

[51] Int. Cl.$^6$ ...................................................... C03B 11/06
[52] U.S. Cl. .................... 65/374.11; 65/26; 65/374.12; 65/374.13
[58] Field of Search .............................. 65/26, 27, 374.1, 65/374.11, 374.12, 374.13

[56] References Cited

U.S. PATENT DOCUMENTS

| | | | |
|---|---|---|---|
| 3,589,986 | 6/1971 | Null ........................................ | 205/122 |
| 3,792,986 | 2/1974 | Scott et al. ................................ | 65/27 |
| 4,218,243 | 8/1980 | Kiyonaga et al. ......................... | 420/36 |
| 4,251,254 | 2/1981 | Klomp et al. ......................... | 65/374.11 |
| 4,382,811 | 5/1983 | Luscher et al. ...................... | 65/374.11 |
| 5,120,341 | 6/1992 | Nozawa et al. ............................ | 65/26 |

*Primary Examiner*—Sean Vincent
*Attorney, Agent, or Firm*—Oblon, Spivak, McClelland, Maier & Neustadt, P.C.

[57] ABSTRACT

A mold for forming glass, which comprises a mold body made of stainless steel and having a mold surface comprising a sidewall portion and a face portion continuous from the sidewall portion, a coating film of ductile material formed on the sidewall portion, and a coating film of high hardness material having oxidation resistance, formed on the face portion.

10 Claims, 1 Drawing Sheet

MOLD FOR FORMING GLASS AND METHOD FOR FORMING GLASS

BACKGROUND OF THE INVENTION

1. Field of the Invention

The present invention relates to a mold for forming glass, particularly to a mold for forming glass, which is useful for press-molding a glass product such as a panel or funnel for a cathode ray tube (CRT) for TV.

2. Discussion of Background

A CRT for TV is produced in such a manner that a front panel, a funnel and a neck are prepared separately, and after applying phosphors to the inner surface of the panel and attaching a shallow mask and electrodes, they are bonded to form a CRT. Therefore, very strict quality control is required for the properties such as the surface irregularities, the surface roughness of the inner surface of the panel.

FIG. 1 shows a cross sectional schematic view illustrating the molding of a panel glass for a CRT. Molding of the panel is carried out by pressing a molten glass at a high temperature of about 1,000° C. by a mold. Therefore, the mold for forming glass is required to have mechanical strength and heat resistance and further required to have a property such as chemical stability against a high temperature glass.

As a mold for forming glass, which is suitable for such a purpose, one having chromium plating or nickel tungsten alloy plating applied on stainless steel, has been commonly used. The plated coating film undergoes deterioration by use, and the mold body is reused by removing the coating film and applying plating afresh. To carry out chromium plating which is suitable for the mold, a plating bath such as a sergent bath, a mixed catalyst bath or a high efficiency bath, is used, and each contains highly toxic hexavalent chromium.

Further, as shown in FIG. 1, when molten glass charged in a bottom mold 13, is pressed by a plunger 11 for molding and the plunger 11 is withdrawn from the solidified panel 10, burr-like brittle marks (FIG. 2) are likely to form on the sidewall portion 14 of the plunger due to friction with the inside wall of the panel. In every molding operation, glass enters into such brittle marks formed on the sidewall portion of the plunger 11, and when the plunger 11 ascends, the brittle marks will abrade the entered glass to bring about scuff defects on the inside surface of the panel 10, and checks are likely to start from such defects, thus leading to deterioration of the quality of the panel.

To prevent this, it is necessary to apply a releasing agent frequently. Further, a plated coating film of chromium has a drawback such that it is extremely weak against halogen-type impurities.

On the other hand, a plated coating film of nickel or cobalt, or an alloy containing such an element as the main component is excellent in a releasing property and free from formation of brittle marks which is likely to take place with chromium plating, and it tends to have ductile marks in to which glass hardly enters. Thus, it has a feature that marks which bring about kinky threads on the inner surface of the panel, hardly form. For example, nickel-tungsten alloy plating can be used for film forming under such conditions that there will be no problem of toxicity or odor of reagents, whereby no scuff tends to form on the glass surface, and the frequency of using a releasing agent can be reduced. Accordingly, its use has recently been increased. However, a plated coating film of nickel or cobalt, or an alloy containing such an element as the main component, is likely to undergo, under a high temperature condition, mutual diffusion with iron in the stainless steel as the matrix material of the plunger and is readily oxidized, so that a chemically and mechanically stable oxide film tends to be hardly formed at the coating film surface. Accordingly, the surface roughness and the surface condition of the inner surface of the face panel presenting an image, which are most important from the viewpoint of the panel quality, tend to deteriorate, and it will be required to change the plunger after from 10,000 to 15,000 times of pressing operation, to remove the plated coating film and to carry out plating afresh. Such a coating film has had a drawback that the useful life of the coating film is very short as compared with the above mentioned plated coating film of chromium which is likely to bring about formation of scuff defects on the inner surface of the panel.

SUMMARY OF THE INVENTION

The present inventors have conducted extensive studies to prevent formation of scuff on the inside surface of the panel caused by the brittle marks formed on the sidewall portion of the plunger and to overcome the chemical and mechanical deterioration of the coating film surface which occurs at the face portion of the plunger, so as to prevent deterioration of the surface roughness or surface condition of the inner surface of the face panel and thereby to obtain a panel having good quality free from defects on the inside-wall surface of the panel or the inner surface of the face of the panel. As a result, they have confirmed that the defects formed on the inside-wall surface of the panel and the inner surface of the face can be substantially reduced by selecting the outermost coating film to be formed on the plunger made of stainless steel, so that it will be a combination of coating films having characteristics suitable for the respective portions of the mold surface of the plunger, i.e. the coating film to be formed on the sidewall portion of the plunger is made of a ductile material and the coating film at the face portion is made of a high hardness material having oxidation resistance. Further, they have found that this can be applicable widely to molds for forming glass. The present invention has been accomplished on the basis of such discoveries.

The present invention provides a mold for forming glass, which comprises a mold body made of stainless steel and having a mold surface comprising a sidewall portion and a face portion continuous from the sidewall portion, a coating film of ductile material formed on the sidewall portion, and a coating film of high hardness material having oxidation resistance, formed on the face portion.

Further, the present invention provides the above mold for forming glass, wherein the ductile material is nickel or cobalt, or an alloy containing nickel or cobalt as the main component.

Still further, the present invention provides the above mold for forming glass, wherein the high hardness material is at least one member selected from chromium oxide, aluminum oxide and zirconium oxide.

DETAILED DESCRIPTION OF THE PREFERRED EMBODIMENTS

Figure 1:
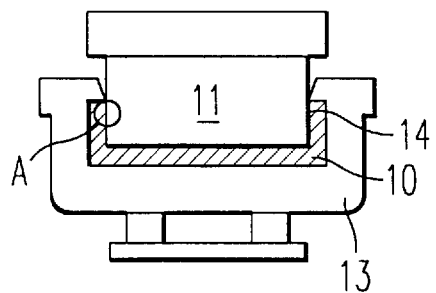
FIG. 1 is a cross sectional schematic view illustrating the molding of a panel glass for a CRT.
Figure 2:
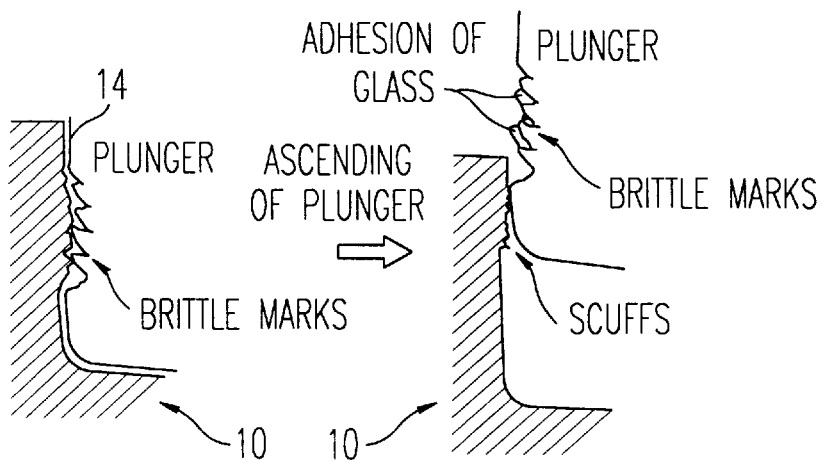
FIG. 2 is an enlarged view of portion A in FIG. 1.

The mold of the present invention has a mold surface comprising a sidewall portion and a face portion continuous from the sidewall portion, on a mold body made of stainless steel. Here, the sidewall portion indicates the portion at which the mold and the glass abrade or are likely to abrade each other during the press molding of the glass. For example, in the case of a plunger for forming a panel of a CRT for TV, it corresponds to the mold surface for forming the sidewall of the panel or the inner surface of the flange portion, and the face portion means a portion other than the sidewall portion and corresponds to the mold surface for forming the image region of the panel or the inner surface of the face.

The present invention is applicable irrespective of a top or bottom mold or a male or female mold, so long as the mold has such a sidewall portion and a face portion, and due effects can be expected. However, its effects are particularly large with a plunger, as the abrasion between the glass and the mold is relatively vigorous during the molding. The coating film or plated film to be formed on the mold surface intended by she present invention, is the outermost coating film which will be in direct contact with the glass. However, if such the outermost coating film has a multi-layer structure, the coating film is meant for the entire multi-layer film.

The ductile material for the coating film to be formed on the sidewall portion of the mold is preferably such that the hardness is relatively small, and even when scuff is formed by abrasion with the glass, they will be ductile marks into which the glass will not enter, and burr-like brittle marks into which the glass enters, will be scarcely formed. As such a material, preferred is a material having a hardness of from 100 to 800 $kg/mm^2$, more preferably from 200 to 600 $kg/mm^2$, as measured by a Vickers hardness meter.

As a specific material, a single substance of nickel or cobalt, or an alloy thereof, is effective. In order to secure the desired properties of the sidewall portion of the mold, an alloy having a nickel or cobalt content of at least 40 wt %, is preferred. As the element to be alloyed with nickel or cobalt, a Group 6 element such as chromium, tungsten or molybdenum is suitable to obtain effects of suppressing high temperature oxidation, suppressing growth of crystal grains and maintaining high temperature strength during the molding of glass. Further, addition of phosphorus and/or boron is preferred to suppress the growth of crystal grains of the coating film during the molding of glass and to make crystallites fine or to convert them amorphous to form a structure where crystal grain boundaries are undeveloped.

The high hardness material for the coating film to be formed on the base portion of the mold is suitably one having oxidation resistance and a hardness higher than the above ductile material. Its hardness usually exceeds 800 $kg/mm^2$ as measured by a Vickers hardness meter. Particularly preferred is a material having a hardness of 900 $kg/mm^2$ or more. Specifically, it is preferred to make the coating film mainly from at least one member selected from chromium oxide, aluminum oxide and zirconium oxide. Even when the coating film is formed as a metal coating film of chromium, aluminum or zirconium, at least its surface layer will be oxidized to an oxide during its use. Accordingly, in the present invention, the material is represented by such an oxide. For the same reason, the coating film may be a coating film of chromium. Further, two or more high hardness materials may be used in combination. Such a combination may be in the form of a multi-layer film or a mixed coating film.

Further, when the coating films are to be formed by using these materials, in order to adequately secure the properties of the face portion of the mold, it is preferred to form an interlayer of chromium plating on the mold body made of stainless steel. The coating film is formed on this interlayer, whereby peeling of the outermost coating film on the face portion of the mold can be facilitated by electrolytic peeling by utilizing this plated interlayer of chromium.

The coating film of ductile material and the interlayer of chromium plating may be prepared by a plating method, a CVD method, a PVD method or a hot spraying method of nickel, chromium or cobalt. Particularly preferred is a plating method in view of the film-forming speed, smoothness and costs. On the other hand, chromium oxide, aluminum oxide or zirconium oxide can readily be prepared by a CVD method or a PVD method. In the case of chromium oxide, chromium as an interlayer may be subjected to suitable air oxidation treatment to form chromium oxide.

The thickness of the coating film of chromium oxide, aluminum oxide or zirconium oxide as a hardness material having oxidation resistance, is preferably from 0.5 to 15 $\mu$m. If it is thinner than 0.5 $\mu$m, the quality of the glass surface property which can be brought about by forming such a hard film, can hardly adequately be secured. On the other hand, if it exceeds 15 $\mu$m, a stress appears to the coating film itself, and cracking or peeling is likely to take place when such a coating film has been formed.

In a case where a plated interlayer is formed between the stainless steel mold body and the outermost coating film, the thickness of the entire film from the surface of the mold body to the ductile material coating film at the sidewall portion or to the high hardness material coating film at the face portion, is preferably from 1 to 50 $\mu$m. If the thickness is thinner than 1 $\mu$m, it tends to be practically difficult to effectively cover the entire surface, and if it is thicker than 50 $\mu$m, the residual strain increases, and cracking or the like is likely to take place in the coating film. The stainless steel constituting the mold body is preferably martensitic stainless steel in view of the mechanical strength, corrosion resistance, thermal conductivity, thermal expansion properties, etc.

Further, according to the present invention, a glass product of high quality can be press-molded by using the above mold. The mold of the present invention is particularly suitable for forming a glass panel for a CRT. In such a case, the glass composition is not particularly limited. However, a glass containing silicon oxide, sodium oxide, potassium oxide, strontium oxide and barium oxide, is usually employed. When such a glass is molded by means of the mold for forming glass of the present invention, a product having high quality with good surface condition of the inner surface of the face of the panel, can be obtained, which is excellent in releasing property and which is free from mark defects on the inside-wall surface of the panel, even without changing the molding conditions or taking a special measure.

Figure 3:
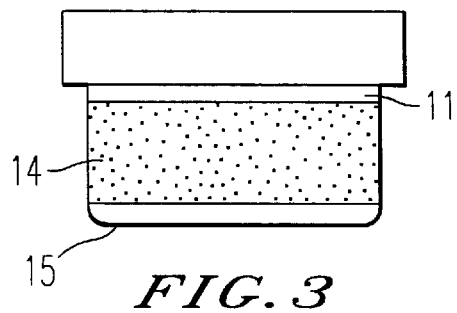
FIG. 3 is a side view of a plunger as an embodiment of the present invention.

Now, the present invention will be described in further detail with reference to Examples (Examples 1 to 12) and Comparative Examples (Examples 13 and 14). In each Example, a plunger 11 made of martensitic stainless steel SUS420J2 (JIS-G4303) was used as the mold body, as shown in FIG. 3, and prescribed coating films were formed on the sidewall portion 14 and on the face portion 15 of this plunger, respectively. However, the present invention is not limited to such a specific structure.

EXAMPLE 1

On the sidewall portion of the plunger, nickel was formed in a thickness from 20 $\mu$m by electroplating, and on the face portion, chromium was formed in a thickness of 20 μm by electroplating. The plated chromium at the face portion was subjected to oxidation treatment by means of a gas burner to form chromium oxide in a thickness of 1 μm on the outermost surface. Using this plunger, a CRT panel was formed. The results are shown in Table 1.

EXAMPLE 2

On the sidewall portion of the plunger, nickel was formed in a thickness of 20 μm by electroplating, and on the face portion, chromium was formed in a thickness of 20 μm by electroplating and then chromium oxide was vapor-deposited in a thickness of 2 μm by a PVD method. Using this plunger, a CRT panel was formed. The results are shown in Table 1.

EXAMPLE 3

On the sidewall portion of the plunger, nickel-tungsten (weight ratio of nickel:tungsten=72:28) was formed in a thickness of 20 μm by electroplating, and on the face portion, chromium was formed in a thickness of 15 μm by electroplating and then, chromium oxide was vapor-deposited in a thickness of 2 μm by a PVD method. Using this plunger, a CRT panel was formed. The results are shown in Table 1.

EXAMPLE 4

On the sidewall portion of the plunger, nickel-tungsten-molybdenum (weight ratio of nickel:tungsten:molybdenum=70:20:10) was formed in a thickness of 20 μm by electroplating, and on the face portion, chromium was formed in a thickness of 15 μm by electroplating and then, chromium oxide was vapor-deposited in a thickness of 2 μm by a PVD method. Using this plunger, a CRT panel was formed. The results are shown in Table 1.

EXAMPLE 5

On the sidewall portion of the plunger, nickel-tungsten (weight ratio of nickel:tungsten=72:28) was formed in a thickness of 35 μm by electroplating, and on the face portion, chromium was formed in a thickness of 20 μm by electroplating, and then, chromium oxide was vapor-deposited in a thickness of 2 μm by a PVD method, and aluminum oxide was further vapor-deposited in a thickness of 3 μm. By using this plunger, a CRT panel was formed. The results are shown in Table 1.

EXAMPLE 6

On the sidewall portion of the plunger, nickel was formed in a thickness of 40 μm by electroplating, and on the face portion, chromium was formed in a thickness 20 μm by electroplating, and then, chromium oxide was vapor-deposited in a thickness of 2 μm by a PVD method, and further aluminum oxide and zirconium oxide were vapor-deposited in a thickness of 1.5 μm and 2 μm, respectively. Using this plunger, a CRT panel was formed. The results are shown in Table 1.

EXAMPLE 7

On the sidewall portion of the plunger, nickel-tungsten (weight ratio of nickel:tungsten=68:32) was formed in a thickness of 20 μm by electroplating, and on the face portion, chromium was formed in a thickness of 15 μm by electroplating and then, chromium oxide was vapor-deposited in a thickness of 2 μm by a PVD method. Using this plunger, a CRT panel was formed. The results are shown in Table 1.

EXAMPLE 8

On the sidewall portion of the plunger, nickel-tungsten (weight ratio of nickel:tungsten=70:30) was formed in a thickness of 20 μm by electroplating, and on the face portion, chromium was formed in a thickness of 15 μm by electroplating and then, zirconium oxide was vapor-deposited in a thickness of 2 μm by a PVD method. Using this plunger, a CRT panel was formed. The results are shown in Table 1.

EXAMPLE 9

On the sidewall portion of the plunger, nickel-tungsten (weight ratio of nickel:tungsten=68:32) was formed in a thickness of 20 μm by electroplating, and on the face portion, chromium was formed in a thickness of 15 μm by electroplating and then, aluminum oxide was vapor-deposited in a thickness of 2 μm by a PVD method. Using this plunger, a CRT panel was formed. The results are shown in Table 1.

EXAMPLE 10

On the sidewall portion of the plunger, nickel was formed in a thickness of 40 μm by electroplating, and on the face portion, chromium was formed in a thickness of 25 μm by electroplating, then, chromium oxide was vapor-deposited in a thickness of 4 by PVD method, and aluminum oxide and zirconium oxide were further vapor-deposited in a thickness of 4 μm and 4 μm, respectively. Using this plunger, a CRT panel was formed. The results are shown in Table 1.

EXAMPLE 11

On the sidewall portion of the plunger, nickel was formed in a thickness of 40 μm by electroplating, and on the face portion, chromium was formed in a thickness of 25 μm by electroplating and then, aluminum oxide and zirconium oxide were vapor-deposited by a PVD method in a thickness of 0.1 μm and 0.1 μm, respectively. Using this plunger, a CRT panel was formed. The results are shown in Table 1.

EXAMPLE 12

On the sidewall portion of the plunger, nickel was formed in a thickness of 25 μm by electroplating, and on the face portion, chromium was formed in a thickness of 20 μm by electroplating and then, chromium oxide was formed in a thickness of 0.2 μm by heat treatment. Using this plunger, a CRT panel was formed. The results are shown in Table 1.

EXAMPLE 13

On the sidewall portion of the plunger and on the face portion, chromium was precipitated in a thickness of 20 μm by electroplating. Using this plunger, a CRT panel was formed. The results are shown in Table 1.

EXAMPLE 14

On the sidewall portion and the face portion of the plunger, nickel was precipitated in a thickness of 20 μm by electroplating. By using this plunger, a CRT panel was formed. The results are shown in Table 1.

TABLE 1

| Ex. No. | Material for sidewall portion | Material for face portion | Scuff forming ratio | Plunger life (Number of pressing operations) |
|---|---|---|---|---|
| 1 | Ni(20) | Cr(20) + CO(1) | 0.05 | 65000 (Job completed) |
| 2 | Ni(20) | Cr(20) + CO(2) | 0.03 | 74000 (Job completed) |
| 3 | Ni-W(20) | Cr(15) + CO(2) | 0.02 | 70000 (Job completed) |
| 4 | Ni-W-MO(20) | Cr(15) + CO(2) | 0 | 72000 (Job completed) |
| 5 | Ni-W(35) | Cr(20) + CO(2) + AO(3) | 0 | 95000 (Job completed) |
| 6 | Ni(40) | Cr(20) + CO(1.5) + AO(2) | 0.02 | 90000 (Job completed) |
| 7 | Ni-W(20) | Cr(20) + CO(2) | 0.02 | 75000 (Job completed) |
| 8 | NI-W(20) | Cr(15) + ZO(2) | 0.02 | 75000 (Job completed) |
| 9 | Ni-W(20) | Cr(15) + AO(2) | 0.04 | 70000 (Job completed) |
| 10 | Ni(40) | Cr(25) + CO(4) + AO(4) + ZO(4) | 0 | 85000 (Job completed) |
| 11 | Ni(40) | Cr(25) + AO(0.1) + ZO(0.1) | 0.05 | 23000 (Inner surface roughened) |
| 12 | Ni(25) | Cr(20) + CO(0.2) | 0.08 | 20000 (Inner surface roughened) |
| 13 | Cr(20) | Cr(20) | 5.5 | 10000 (scuff on inside surface) |
| 14 | Ni(20) | Ni(20) | 0.05 | 8000 (Inner surface roughened) |

CO: Chromium oxide, AO: Aluminum oxide,
ZO: Zirconium oxide
The numerals in the brackets ( ) in the columns for "material for side wall portion" and "Material for face portion" represent the thicknesses (μm)
Scuff forming ratio: Scuff forming ratio on inner surface (%)
The remarks in the brackets ( ) in the column for "plunger life" represent reasons for changing the plunger.

The mold of the present invention has coating films suitable for the particular portions or positions of the mold surface, selectively combined, whereby the moldability which gives a substantial influence over the quality of the molded products, or the life of the mold, is improved. If this mold is used for forming e.g. a CRT panel, it is possible to use the mold continuously for a long period of time even when the frequency of applying a releasing agent is reduced. Further, it is possible to prevent formation of scuff on the inside surface of the panel caused by brittle marks formed on the sidewall portion of the mold and to reduce the chemical and mechanical deterioration at the coating surface, which occurs at the face portion of the metal, whereby it is possible to suppress formation of defects on the inside surface of the panel and on the inner surface of the face, and a panel having good quality can be obtained.

What is claimed is:

1. A mold for forming a glass panel for a cathode ray tube, which comprises a mold body made of stainless steel and having a mold surface comprising a sidewall portion and a face portion continuous from the sidewall portion, a coating film of ductile material having a nickel or cobalt content of at least 40 wt % formed on the sidewall portion, and a coating film of high hardness material having oxidation resistance, formed on the face portion.

2. The mold for forming glass according to claim 1, wherein the ductile material is selected from the group consisting of nickel, cobalt, a nickel-based alloy, and a cobalt-based alloy.

3. The mold for forming glass according to claim 1, wherein the coating film of ductile material has a hardness of from 100 to 800 kg/mm$^2$ as measured by a Vickers hardness meter.

4. The mold for forming glass according to claim 1, wherein the high hardness material is at least one member selected from chromium oxide, aluminum oxide and zirconium oxide.

5. The mold for forming glass according to claim 4, wherein the coating film of high hardness material has a thickness of from 0.5 to 15 μm.

6. The mold for forming glass according to claim 4, wherein the coating film of high hardness material has a hardness exceeding 800 kg/mm$^2$ as measured by a Vickers hardness meter.

7. The mold for forming glass according to claim 1, wherein the stainless steel is martensitic stainless steel.

8. The mold for forming glass according to claim 1, wherein an interlayer of chromium is interposed between the stainless steel mold body and the outermost coating film at least at the face portion of the mold.

9. The mold for forming glass according to claim 8, wherein the thickness of the entire coating from the surface of the stainless steel mold body to the outermost coating film is from 1 to 50 μm.

10. A method for forming a glass panel for a cathode ray tube, which comprises forming a glass panel with a mold body made of stainless steel and having a mold surface comprising a sidewall portion and a face portion continuous from the sidewall portion, a coating film of ductile material having a nickel or cobalt content of at least 40 wt % formed on the sidewall portion, and a coating film of high hardness material having oxidation resistance, formed on the face portion.

* * * * *